United States Patent
Bauch et al.

(10) Patent No.: US 11,915,489 B2
(45) Date of Patent: Feb. 27, 2024

(54) METHOD, DEVICE, COMPUTER PROGRAM AND COMPUTER PROGRAM PRODUCT FOR OPERATING A VEHICLE

(71) Applicant: Bayerische Motoren Werke Aktiengesellschaft, Munich (DE)

(72) Inventors: Dominik Bauch, Muehldorf am Inn (DE); Marco Baumgartl, Gilching (DE); Michael Himmelsbach, Munich (DE); Josef Mehringer, Gmund (DE); Daniel Meissner, Friedberg (DE); Luca Trentinaglia, Eichenau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 115 days.

(21) Appl. No.: 17/421,395

(22) PCT Filed: Oct. 29, 2019

(86) PCT No.: PCT/EP2019/079446
§ 371 (c)(1),
(2) Date: Jul. 8, 2021

(87) PCT Pub. No.: WO2020/160801
PCT Pub. Date: Aug. 13, 2020

(65) Prior Publication Data
US 2022/0092875 A1 Mar. 24, 2022

(30) Foreign Application Priority Data
Feb. 6, 2019 (DE) .................... 10 2019 102 919.8

(51) Int. Cl.
*G06V 20/56* (2022.01)
*B60W 40/04* (2006.01)
*B60W 50/00* (2006.01)

(52) U.S. Cl.
CPC ............ *G06V 20/56* (2022.01); *B60W 40/04* (2013.01); *B60W 2050/0028* (2013.01);
(Continued)

(58) Field of Classification Search
None
See application file for complete search history.

(56) References Cited

U.S. PATENT DOCUMENTS

2014/0343750 A1* 11/2014 Minemura .......... B60W 30/085
701/1
2016/0121889 A1 5/2016 Shimomura et al.
(Continued)

FOREIGN PATENT DOCUMENTS

DE 102014217848 A1 3/2016
DE 102015008539 A1 1/2017
(Continued)

*Primary Examiner* — Peter D Nolan
*Assistant Examiner* — Michael F Whalen
(74) *Attorney, Agent, or Firm* — Yong Beom Hwang; 2SPL Patent Attorneys PartG mbB

(57) ABSTRACT

In a method of operating a vehicle, sensor data comprising an object detection of a sensor of the vehicle is provided, the object detection being representative of a detected object. Further, a trust model is provided, wherein the trust model is configured to model a trust in object detection. Depending on the sensor data and the trust model, a trust value of the detected object is determined, the trust value of the detected object being representative of how high a trust in the detected object is. The vehicle is operated depending on the trust value of the detected object.

10 Claims, 1 Drawing Sheet

(52) U.S. Cl.
CPC ..... *B60W 2400/00* (2013.01); *B60W 2554/20* (2020.02); *B60W 2554/4041* (2020.02)

(56) References Cited

U.S. PATENT DOCUMENTS

| | | |
|---|---|---|
| 2017/0248951 A1 | 8/2017 | Perkins et al. |
| 2018/0022354 A1* | 1/2018 | Akatsuka ............. B62D 15/026 701/41 |
| 2018/0046182 A1* | 2/2018 | Joyce ................. G01C 21/3453 |
| 2019/0130754 A1* | 5/2019 | Mueck ................... G08G 1/163 |

FOREIGN PATENT DOCUMENTS

| | | |
|---|---|---|
| DE | 102017125421 A1 | 5/2018 |
| EP | 2803546 A1 | 11/2014 |
| JP | 2010132056 A | 6/2010 |

\* cited by examiner

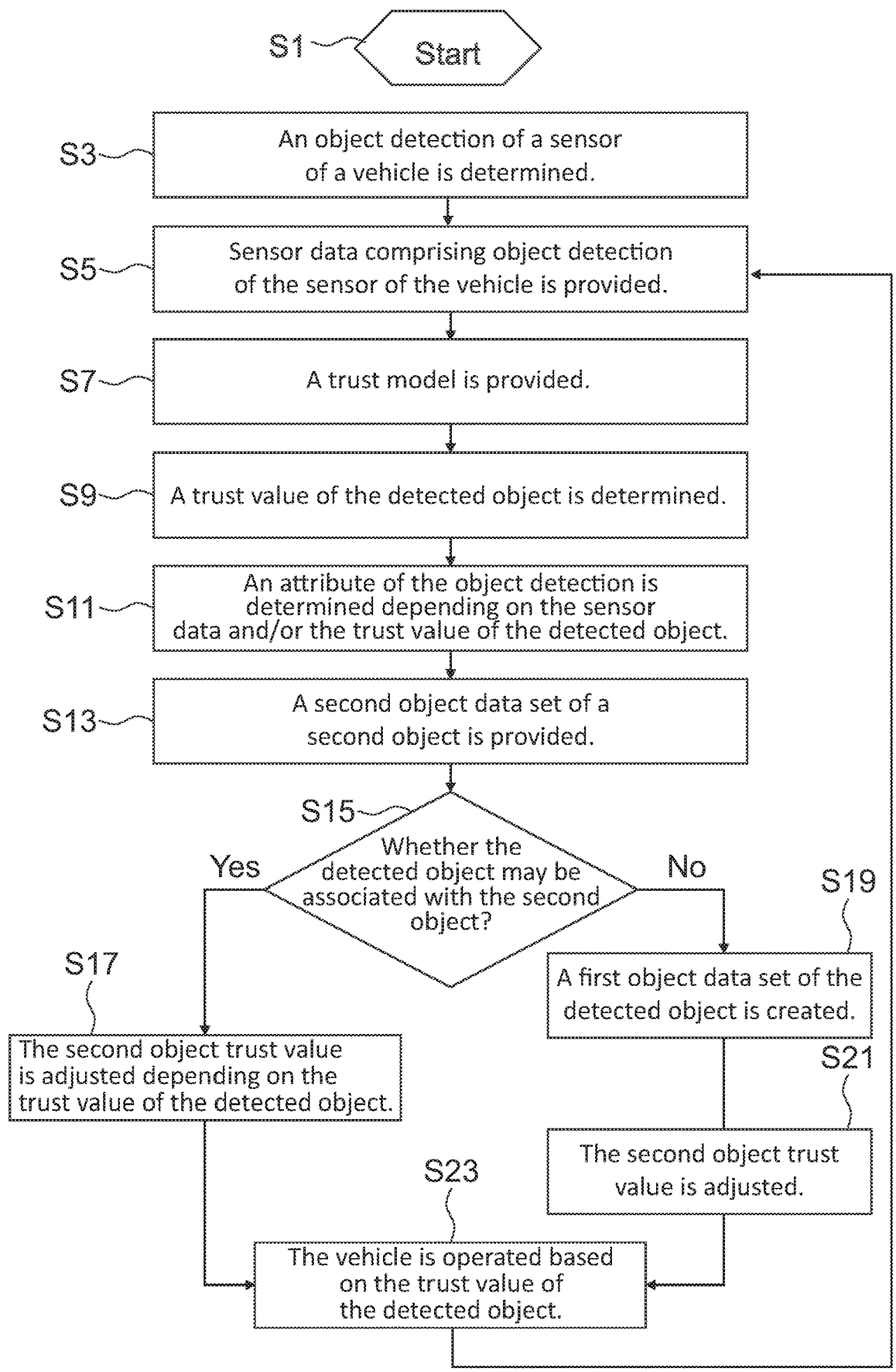

METHOD, DEVICE, COMPUTER PROGRAM AND COMPUTER PROGRAM PRODUCT FOR OPERATING A VEHICLE

CROSS-REFERENCE TO RELATED APPLICATIONS

This application is a 35 U.S.C. § 371(c) national stage entry of PCT/EP2019/079446, filed on Oct. 29, 2019. That application claimed priority to German Application 10 2019 102 919.8 filed on Feb. 6, 2019. The contents of the earlier filed applications are incorporated by reference herein in their entirety.

FIELD

The invention relates to a method of operating a vehicle. The invention further relates to a device for operating a vehicle. The invention further relates to a computer program and computer program product for operating a vehicle.

BACKGROUND

Sensors in vehicles may provide the vehicles with data on object detections that may be used by vehicle functions.

The task underlying the invention is to contribute to a high level of vehicle safety.

SUMMARY

The task is solved by the features of the independent patent claims. Advantageous implementations are indicated in the subclaims.

According to a first aspect, the invention is characterized by a method of operating a vehicle.

In the method according to the first aspect, sensor data comprising an object detection of a sensor of the vehicle is provided, wherein the object detection is representative of a detected object. Further, a trust model is provided, wherein the trust model is configured to model a trust in object detection. Depending on the sensor data and the trust model, a trust value of the detected object is determined, wherein the trust value of the detected object is representative of how high a trust in the detected object is. The vehicle is operated depending on the trust value of the detected object.

Hereby, it is possible to check the sensor data by means of the trust model and the trust value of the detected object, as well as to verify and/or validate them. This allows some sort of quality stamp to be assigned to the object detection to either increase or decrease its integrity. Furthermore, this may, for example, increase a safety of the vehicle if the sensor data is used by a vehicle function of the vehicle. For example, the sensor data may also be used by multiple vehicle functions of the vehicle.

For example, the sensor data comprises one or more data sets comprising object detection by the sensor of the vehicle. For example, the sensor data may also include a plurality of object detections from the sensor, each of the plurality of object detections being representative of a respective detected object. For example, the sensor data may also comprise one or more object detections of different sensors of the vehicle, wherein the method is performed for the respective object detection, for example. For example, the trust model and the trust value may be used to fuse the multiple object detections from different sensors of the vehicle, such as in a sensor fusion system. For example, the sensor fusion system is configured to fuse a first object detection of a first sensor of the vehicle with a second object detection of a second sensor of the vehicle if the first and second object detections are representative of the detected object.

For example, the sensor data is provided for one data processing period at a time. For example, the data processing period depends on a sampling frequency of the sensor and/or a processing time of the sensor. For example, the sensor and/or the different sensors of the vehicle are heterogeneous sensors. The sensor and/or the different sensors of the vehicle comprise, for example, a camera sensor and/or a radar sensor and/or a sensor for navigation, such as a GPS receiver, and/or a laser sensor, such as a lidar sensor and/or a ladar sensor, and/or an ultrasonic sensor and/or an infrared sensor or the like.

For example, the vehicle comprises the sensor of the vehicle and/or the different sensors of the vehicle. For example, the vehicle may also have several sensors of the same type.

For example, the detected object is representative of a moving object. Furthermore, the detected object may also be representative of a stationary object, for example. For example, the detected object may be representative of an object on the road, such as an animal, a barrier, a roadside, a car, a pedestrian, a wall, or the like.

For example, the trust model may include one or more trust submodels. The one or more trust submodels are configured to model trust in object detection, or at least to model a respective partial aspect of trust in object detection. For example, trust in object detection is modeled depending on a type of sensor and/or states of object detection and/or states of the vehicle or the like.

For example, the trust value of the detected object is determined depending on the trust model and/or the trust submodels. For example, the trust value of the detected object may comprise a value on a continuous scale. Furthermore, the trust value of the detected object may also have multiple values, each representative of one of the trust submodels, for example.

For example, operating the vehicle includes performing a vehicle function of the vehicle that uses the sensor data depending on the trust value of the detected object. For example, the vehicle function uses tracking of object detections and/or object tracking and/or track management methods for this purpose, such as in "Y. Bar-Shalom, X. R. Li, 1995, Multitarget multisensor tracking: Principles and Techniques, ISBN-13: 978-0964831209".

For example, depending on the sensor data and/or the trust model and/or the trust value of the detected object, an object list is determined to be provided to the vehicle function of the vehicle. The object list includes, for example, information and states of the detected object.

For example, depending on standardized quantities used in connection with object tracking and/or track management methods, an initial trust value of the detected object is determined. The initial trust value of the detected object is representative of how high an initial trust in the detected object is, for example, when the detected object is detected for the first time.

For example, the initial trust value of the detected object is additionally determined depending on sensor data of the initial detection of the detected object. Further, for example, an extended trust value of the detected object may be determined depending on the trust value of the detected object and the initial trust value of the detected object. For example, in determining the extended trust value of the detected object, the initial trust value of the detected object is fused with the trust value of the detected object in the sensor fusion system. For example, depending on the trust value of the detected object and/or the extended trust value of the detected object, sensor data sets comprising multiple object detections from the different sensors may be fused in the sensor fusion system.

According to an optional embodiment, information is provided regarding the type of sensor. The trust model further comprises a sensor trust model, the sensor trust model being configured to model the trust in object detection depending on a type of a respective sensor. The trust value of the detected object is determined depending on the sensor data, the information on the type of sensor and the trust model.

Hereby it is possible with the trust value of the detected object, depending on the sensor trust model, to consider the object detection of the sensor with respect to the type of sensor. Thus, for example, in a sensor fusion, the different sensors may be weighted differently.

For example, depending on the type of the respective sensor in question and the sensor trust model, object detection is considered to varying degrees when determining the trust value of the detected object.

For example, the sensor trust model comprises a simulation model and/or a mathematical model and/or characteristic data or the like of the respective sensor.

According to another optional embodiment, object state information is provided comprising information about a state of the detected object during object detection. The trust model further comprises a state trust model, the state trust model being configured to model the trust in the object detection depending on a respective state of the detected object during the object detection. The trust value of the detected object is determined depending on the sensor data, the object state information and the trust model.

Hereby, it is possible with the trust value of the detected object, depending on the state trust model, to consider the object detection of the sensor differently depending on the state of the detected object with respect to different states of the detected object and/or other objects.

For example, depending on the particular state of the detected object and the state trust model, object detection is considered to varying degrees in determining the trust value of the detected object.

For example, the object state information includes a position of the detected object and/or an orientation of the detected object and/or a velocity of the detected object, or the like. For example, the object state information additionally comprises information about a predetermined area in the environment of the vehicle. The predefined area in the environment of the vehicle depends, for example, on a detection range of the sensor and/or is representative of a statistical accumulation of false alarms.

According to another optional embodiment, vehicle state information is provided comprising information about a state of the vehicle during object detection. The trust model further comprises an environment trust model, the environment trust model being configured to model the trust in the object detection depending on a respective state of the vehicle during the object detection. The trust value of the detected object is determined depending on the sensor data, the vehicle state information and the trust model.

Hereby it is possible with the trust value of the detected object, depending on the environment trust model, to consider the object detection of the sensor differently depending on the state of the vehicle with respect to different states of the vehicle.

For example, depending on the particular state of the vehicle and the environment trust model, object detection is considered to varying degrees in determining the trust value of the detected object.

For example, the vehicle state information includes information about the type of road currently being traveled and/or current visibility conditions and/or a speed of the vehicle, or the like.

According to another optional embodiment, sensor range information is provided comprising range dependent information of the sensor. Further, an initial position of the detected object is provided, wherein the initial position of the detected object is representative of a position at an initial detection of the detected object. Further, the trust model comprises an initial trust model, the initial trust model being configured to model the trust in the object detection depending on a respective initial position of the detected object and a respective range-dependent information of the sensor. The trust value of the detected object is determined depending on the sensor data, the sensor range information, the initial position of the detected object, and the trust model.

Hereby, it is possible with the trust value of the detected object, depending on the initial trust model, to consider the object detection of the sensor differently depending on the range-dependent information of the sensor and the initial position of the detected object with respect to different initial positions of the detected object.

For example, depending on the respective initial position of the detected object and on the respective range-dependent information of the sensor and on the initial trust model, the object detection is considered to different extents in determining the trust value of the detected object.

For example, the initial trust model includes information about the detection range of the sensor and/or a range-dependent statistical false detection probability of the sensor. Additionally, the initial trust model may also include one or more assumptions regarding the vehicle environment. For example, an assumption regarding the vehicle environment includes that at least two detected objects may not be fully or partially superimposed.

According to a further optional embodiment, an attribute of the object detection is determined depending on the sensor data and/or the trust value of the detected object. The object detection attribute is representative of a quality and/or a confidence of object detection. The vehicle is operated depending on the object detection attribute.

For example, the object detection attribute corresponds to one of the standardized quantities used in the context of object tracking and/or track management methods. Furthermore, several attributes of the object detection may also be determined, for example.

Hereby, depending on the sensor data and/or the trust value of the detected object, it is possible to determine the standardized quantities used in connection with the object tracking and/or the track management methods.

For example, the standardized quantities used in connection with object tracking and/or track management methods are not determined depending on a uniform database and/or are heavily dependent on algorithms of a sensor manufacturer. This has an unfavorable effect in the sensor fusion system, for example. By determining the object detection attribute depending on the trust value of the detected object, it is possible to improve the sensor fusion system and contribute to high vehicle safety.

For example, the object list is additionally determined depending on the attribute of the object detection and the object list is provided to the vehicle function of the vehicle. For example, the object list also includes the object detection attribute.

For example, the object detection attribute may include multiple attributes.

According to a further optional embodiment, the object detection attribute comprises an existence probability representative of how high a statistical probability of an existence of the detected object is, and/or a quality measure of the sensor, and/or one or more standard deviations from a respective state of the detected object during the object detection.

Hereby, it is possible to use the object detection attribute determined depending on the sensor data and/or the trust value of the detected object in connection with the object tracking and/or the track management methods.

For example, the vehicle function of the vehicle comprising object tracking and/or track management methods may operate the vehicle depending on the sensor data and/or the trust value of the detected object.

According to a further optional embodiment, a first object data set of the detected object is created upon an initial detection of the detected object. The first object data set includes a first object trust value and a unique first object identification number representative of the detected object. Furthermore, the first object trust value is determined depending on the trust value of the detected object. The vehicle is operated depending on the first object data set. This makes it possible to take detected objects into account when operating the vehicle for the first time.

For example, the first object data set is additionally stored after determination. For example, the first object trust value is determined depending on the trust value of the detected object such that the first object trust value corresponds to the trust value of the detected object. For example, the stored first object data set is additionally considered in determining the trust value upon a further object detection, wherein the further object detection is provided temporally after the object detection. For example, the stored first object data set is adjusted during further object detection. For example, the stored first object data set is deleted during further object detection. For example, the first object data set is additionally determined depending on the attribute of the object detection.

For example, the object list is additionally determined depending on the first object data set and the object list is provided to the vehicle function of the vehicle.

According to another optional embodiment, a second object data set of a second object is provided. The second object data set includes a second object trust value and a unique second object identification number representative of the second object. Furthermore, it is determined whether the detected object may be assigned to the second object. If the detected object may be assigned to the second object, the second object trust value is adjusted depending on the trust value of the detected object. For example, if the detected object may be associated with the second object, the second object trust value is additionally adjusted depending on the attribute of the object detection. If the detected object may not be assigned to the second object the second object trust value is adjusted. The vehicle is operated depending on the second object data set.

This makes it possible to take a provided second object data set into account when operating the vehicle.

For example, the second object data set is additionally stored after the adjustment. For example, the second object data set additionally comprises further information, such as an observation duration of the detected object. The observation duration is representative of a period of time from the initial detection of the detected object to the object detection. For example, if the detected object may be associated with the second object, the second object trust value is adjusted such that the second object trust value is determined depending on the trust value of the detected object and the observation time of the detected object. For example, if the detected object may not be associated with the second object, the second object trust value is adjusted such that the second object trust value is reduced in value, for example. For example, if the detected object may not be assigned to the second object, the second object data set is deleted. For example, the second object data set is deleted based on a comparison of the second object trust value to a threshold value.

For example, the second object data set may include a plurality of second object data sets representative of different second objects.

For example, the object list is additionally determined depending on the second object data set and the object list is provided to the vehicle function of the vehicle.

According to a second aspect, the invention is characterized by a device of operating a vehicle. The device is adapted to perform the method of operating the vehicle according to the first aspect.

According to a further aspect, the invention is characterized by a computer program, the computer program comprising instructions which, when the program is executed by a computer, cause the computer to perform the method of operating a vehicle when executed on a data processing device. According to another aspect, the invention is characterized by a computer program product comprising executable program code, wherein the program code, when executed by a data processing device, executes the method for operating a vehicle.

In particular, the computer program product comprises a medium readable by the data processing device on which the program code is stored.

BRIEF DESCRIPTION OF THE FIGURES

Examples of embodiments of the invention are explained in more detail below with reference to the schematic drawings, in which:

FIG. 1 shows a flow chart for operating a vehicle.

DETAILED DESCRIPTION

FIG. 1 shows a flowchart of the program for operating a vehicle.

The program is started in a step S1, in which variables are initialized if necessary.

The program is continued in a step S3. In step S3, an object detection of a sensor of a vehicle is determined, the object detection being representative of a detected object.

The program is continued in a step S5. In step S5, sensor data comprising object detection of the sensor of the vehicle is provided.

The program is continued in a step S7. In step S7, a trust model is provided, wherein the trust model is configured to model a trust in object detection.

Optionally, information on the type of sensor is provided in step S7. The trust model further comprises a sensor trust model, the sensor trust model being configured to model the trust in object detection depending on a type of a respective sensor.

Optionally, in step S7, object state information including information about a state of the detected object during object detection is provided. The trust model further comprises a state trust model, the state trust model being configured to model the trust in the object detection depending on a respective state of the detected object during the object detection.

Optionally, in step S7, vehicle state information including information about a state of the vehicle during object detection is provided. The trust model further comprises an environment trust model, the environment trust model being configured to model the trust in the object detection depending on a respective state of the vehicle during the object detection.

Optionally, in step S7, sensor range information comprising range-dependent information of the sensor is provided. Further, an initial position of the detected object is provided, wherein the initial position of the detected object is representative of a position at an initial detection of the detected object. Further, the trust model comprises an initial trust model, the initial trust model being configured to model the trust in the object detection depending on a respective initial position of the detected object and a respective range-dependent information of the sensor.

The program is continued in a step S9. In step S9, depending on the sensor data and the trust model, a trust value of the detected object is determined, wherein the trust value of the detected object is representative of how high a trust in the detected object is.

Optionally, in step S9, the trust value of the detected object is additionally determined depending on the information on the type of sensor.

For example, the sensor trust model is used to determine a false detection rate of the sensor. For example, a first sensor of a first type exists for which a very high first false detection rate is determined. For an object detection of the detected object of the first sensor, a first trust value of the detected object is determined. For example, a second sensor of a second type exists for which a low second false detection rate is determined. For an object detection of the detected object of the second sensor, a second trust value of the detected object is determined. In this case, the first trust value of the detected object is lower in value than the second trust value of the detected object.

Optionally, in step S9, the trust value of the detected object is additionally determined depending on the object state information.

For example, the trust value of the detected object is determined using the state trust model depending on whether a position of the detected object is within a predetermined range in the environment of the vehicle or not. For example, if the position of the detected object is within the specified range in the environment of the vehicle, the trust value of the detected object is greater in value than if it is not. The predefined range is, for example, sensor-specific for a particular type of sensor. For example, if an object is detected in a close range, a near-field sensor is weighted accordingly better than if an object is detected in a far range, in determining the trust value of the detected object.

Optionally, in step S9, the trust value of the detected object is additionally determined depending on the vehicle state information.

For example, the vehicle state information additionally comprises information about current weather conditions, wherein the information about current weather conditions is representative of heavy rain, for example. For example, the trust value of the detected object using the environmental trust model is determined to be lower in value for the camera sensor than for the radar sensor depending on the current weather conditions during heavy rainfall.

Optionally, in step S9, the trust value of the detected object is additionally determined depending on the sensor range information and the initial position of the detected object.

For example, the trust model and the trust value may be used to draw conclusions about whether false detection is the case. For example, the false detection is representative of the sensor detecting the object, where in reality the detected object is not in an environment of the vehicle. Furthermore, conclusions may also be drawn, for example, as to whether a false detection is the case. For example, the false detection is representative of the sensor not detecting another object even though the other object is in reality in the vicinity of the vehicle.

Optionally, the program is continued in a step S11. In optional step S11, an attribute of the object detection is determined depending on the sensor data and/or the trust value of the detected object. The object detection attribute is representative of a quality and/or a confidence of object detection.

The object detection attribute comprises an existence probability representative of how high a statistical probability of an existence of the detected object is, and/or a quality measure of the sensor, and/or one or more standard deviations from a respective state of the detected object during the object detection.

For example, the object detection attribute corresponds to one of the standardized quantities used in the context of object tracking and/or track management methods.

Optionally, the program is continued in a step S13. In optional step S13, a second object data set of a second object is provided. The second object data set includes a second object trust value and a unique second object identification number representative of the second object.

For example, the second object data set is representative of a second track used in connection with the object tracking and/or track management methods. The second track is representative of a mapping of the detected object that is actually in the environment of the vehicle and includes information about it.

For example, the second object data set corresponds to a previously stored first object data set.

Optionally, the program is continued in a step S15. In the optional step S15, it is determined whether the detected object may be associated with the second object. If this is the case, processing continues in step S17, otherwise in step S19.

In step S17, the second object trust value is adjusted depending on the trust value of the detected object. After step S17 the program is continued in step S23.

Optionally, the second object data set is additionally stored after the adjustment.

In step S19, when the detected object is detected for the first time, a first object data set of the detected object is created. The first object data set includes a first object trust value and a unique first object identification number representative of the detected object. Furthermore, the first object trust value is determined depending on the trust value of the detected object.

For example, the first object data set is representative of a first track used in connection with the object tracking and/or track management methods. The first track is representative of a mapping of the detected object that is actually located in the environment of the vehicle and includes information about it.

For example, step S19 may also be performed temporally after step S21.

In step S21, the second object trust value is adjusted. Optionally, the second object data set is additionally stored after the adjustment. After step S19 the program is continued in step S21. After step S21 the program is continued in step S23.

In a step S23, the vehicle is operated depending on the trust value of the detected object.

Optionally, in step S23, the vehicle is additionally operated depending on the object detection attribute.

Optionally, in step S23, the vehicle is additionally operated depending on the first object data set.

Optionally, in step S23, the vehicle is additionally operated depending on the second object data set.

For example, operating the vehicle includes performing a vehicle function of the vehicle that uses the sensor data depending on the trust value of the detected object.

For example, the vehicle function of the vehicle is a longitudinal control vehicle function of the vehicle, such as adaptive cruise control, intersection assist, a distance keeping function, or the like. Alternatively or additionally, the vehicle function of the vehicle is, for example, a lateral control vehicle function of the vehicle, such as a side impact assistant, a steering control assistant, a lane control assistant, or the like. The longitudinal control vehicle function of the vehicle is configured to influence movements substantially along an extension plane of the vehicle. The lateral control vehicle function of the vehicle is configured to substantially influence movements transverse to an extension plane of the vehicle. For example, the longitudinal control vehicle function of the vehicle and/or the lateral control vehicle function of the vehicle comprise a request comprising a respective false detection rate and/or a respective error detection rate or the like. The requirement comprising the respective false detection rate is, for example, representative of a respective predetermined number of false detections not to be exceeded in a respective predetermined time interval and/or over a respective predetermined distance. The requirement comprising the respective false detection rate is, for example, representative of a respective predetermined number of false detections not to be exceeded in a respective predetermined time interval and/or over a respective predetermined distance. For example, the requirement comprising the respective false detection rate and/or the respective error detection rate may be checked depending on the trust value of the detected object and/or the sensor data. For example, the verification determines whether the longitudinal control vehicle function of the vehicle and/or the lateral control vehicle function of the vehicle may use the sensor data to, for example, ensure and/or increase the safety of the vehicle. For example, the verification determines whether a series application of the longitudinal control vehicle function of the vehicle and/or the lateral control vehicle function of the vehicle is possible.

The program is then restarted in step S3.

The invention claimed is:

1. A method of operating a vehicle, comprising:
providing sensor data comprising an object detection of a sensor of the vehicle, the object detection being representative of a detected object,
providing a trust model, wherein the trust model is configured to model a trust in the object detection,
depending on the sensor data and the trust model, determining a trust value of the detected object, the trust value of the detected object being representative of how high a trust in the detected object is,
operating the vehicle based on the trust value of the detected object; and
providing object state information comprising information about a state of the detected object during object detection,
wherein the trust model comprises a state trust model, the state trust model being configured to model the trust in the object detection depending on a respective state of the detected object during the object detection, and the trust value of the detected object is determined based on the sensor data, the object state information, and the trust model.

2. The method according to claim 1, comprising:
providing information about a type of the sensor,
wherein the trust model comprises a sensor trust model, the sensor trust model being configured to model the trust in object detection depending on a type of a respective sensor, and
the trust value of the detected object is determined depending on the sensor data, the information about the type of the sensor, and the trust model.

3. The method according to claim 1, comprising:
providing vehicle state information, comprising information about a state of the vehicle during object detection,
wherein the trust model comprises an environment trust model, the environment trust model being configured to model the trust in the object detection depending on a respective state of the vehicle during the object detection, and
the trust value of the detected object is determined depending on the sensor data, the vehicle state information and the trust model.

4. The method according to claim 1, comprising:
providing sensor range information, comprising range-dependent information of the sensor,
providing an initial position of the detected object, wherein the initial position of the detected object is representative of a position at an initial detection of the detected object,
wherein the trust model comprises an initial trust model, the initial trust model being configured to model the trust in the object detection depending on a respective initial position of the detected object and respective range-dependent information of the sensor, and
the trust value of the detected object is determined depending on the sensor data, the sensor range information, the initial position of the detected object, and the trust model.

5. The method according to claim 1, comprising:
depending on the sensor data and/or the trust value of the detected object, determining an attribute of the object detection, the attribute of the object detection being representative of a quality and/or a confidence of the object detection,
wherein the vehicle is operated depending on the object detection attribute.

6. The method according to claim 5, wherein the object detection attribute:
is a probability of existence which is representative of how high a statistical probability of the existence of the detected object is, and/or
is a quality measure of the sensor and/or comprises one or more standard deviations from a respective state of the detected object during object detection.

7. The method according to claim 1, wherein upon initial detection of the detected object:
- a first object data set of the detected object is created, comprising a first object trust value and a unique first object identification number representative of the detected object,
- the first object trust value is determined depending on the trust value of the detected object, and
- the vehicle is operated depending on the first object data set.

8. The method according to claim 1, wherein:
- a second object data set of a second object is provided comprising a second object trust value and a unique second object identification number representative of the second object,
- it is determined whether the detected object may be assigned to the second object,
- if the detected object may be assigned to the second object, the second object trust value is adjusted depending on the trust value of the detected object,
- if the detected object cannot be assigned to the second object, the second object trust value is adjusted, and
- the vehicle is operated depending on the second object data set.

9. A device for operating a vehicle, the device being configured to perform the method of claim 1.

10. A non-transitory, computer-readable medium comprising executable program code, wherein the program code, when executed by a data processing device, performs the method of claim 1.

* * * * *